United States Patent
Eickhoff et al.

(10) Patent No.: US 11,380,923 B2
(45) Date of Patent: *Jul. 5, 2022

(54) OXYGEN REGULATED FUEL CELL

(71) Applicant: Intelligent Energy Limited

(72) Inventors: Steven J. Eickhoff, Brooklyn Park, MN (US); Jeffrey Michael Klein, Minneapolis (GB); Jason Wiebesick, Golden Valley, MN (US)

(73) Assignee: INTELLIGENT ENERGY LIMITED, Loughborough (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/857,654

(22) Filed: Sep. 17, 2015

(65) Prior Publication Data

US 2017/0084942 A1    Mar. 23, 2017

(51) Int. Cl.
| | | |
|---|---|---|
| *H01M 8/06* | (2016.01) | |
| *H01M 8/10* | (2016.01) | |
| *H01M 8/04* | (2016.01) | |
| *C01B 3/06* | (2006.01) | |
| *H01M 8/065* | (2016.01) | |

(Continued)

(52) U.S. Cl.
CPC ............. *H01M 8/065* (2013.01); *C01B 3/065* (2013.01); *H01M 8/04089* (2013.01); *H01M 8/04104* (2013.01); *H01M 8/0687* (2013.01); *H01M 8/1004* (2013.01); *H01M 8/04201* (2013.01); *H01M 8/1007* (2016.02);

(Continued)

(58) Field of Classification Search
CPC ............. H01M 8/065; H01M 8/04104; H01M 8/04201; H01M 8/0687; H01M 8/1004; C01B 3/065
See application file for complete search history.

(56) References Cited

U.S. PATENT DOCUMENTS

| 5,597,806 A | 1/1997 | Clapp et al. |
| 5,759,712 A * | 6/1998 | Hockaday ........... H01M 8/1007 429/423 |

(Continued)

FOREIGN PATENT DOCUMENTS

| CN | 1243607 A | 2/2000 |
| CN | 101425599 A | 5/2009 |

(Continued)

OTHER PUBLICATIONS (Gibraltar Products, pin size #85933646 {https://www.mscdirect.com/product/details/85933646} (c) 2000-2017, taken as applicable to Dec. 2000).*

(Continued)

*Primary Examiner* — Cynthia H Kelly
*Assistant Examiner* — Aaron Greso
(74) *Attorney, Agent, or Firm* — BakerHostetler LLP (57) ABSTRACT

A device includes a container having a top plate containing an array of oxygen limiting pinholes and a chamber to hold a chemical hydride fuel, a fuel cell proton exchange membrane electrode assembly supported within the container between the top plate and the chamber, a first gas diffusion layer supported between the fuel cell proton exchange membrane electrode assembly and the top plate, and a second gas diffusion layer supported between the fuel cell proton exchange membrane electrode assembly and the chamber.

20 Claims, 5 Drawing Sheets

(51) Int. Cl.
*H01M 8/1004* (2016.01)
*H01M 8/0662* (2016.01)
*H01M 8/04089* (2016.01)
*H01M 8/04082* (2016.01)
*H01M 8/1007* (2016.01)

(52) U.S. Cl.
CPC ............... *H01M 2008/1095* (2013.01); *H01M 2250/30* (2013.01); *Y02B 90/10* (2013.01); *Y02E 60/36* (2013.01)

(56) References Cited

U.S. PATENT DOCUMENTS

| | | | |
|---|---|---|---|
| 5,776,625 A * | 7/1998 | Kaufman | H01M 8/0258 |
| | | | 429/434 |
| 6,440,596 B1 * | 8/2002 | Ruhl | H01M 8/2485 |
| | | | 429/408 |
| 6,451,470 B1 | 9/2002 | Koschany et al. | |
| 7,348,087 B2 | 3/2008 | Kearl et al. | |
| 8,216,743 B2 | 7/2012 | McLean et al. | |
| 8,889,317 B2 | 11/2014 | McLean et al. | |
| 2007/0231673 A1 * | 10/2007 | Noh | B82Y 30/00 |
| | | | 429/483 |
| 2007/0264549 A1 | 11/2007 | Eickhoff et al. | |
| 2009/0081512 A1 * | 3/2009 | Blanchard | H01M 8/122 |
| | | | 429/425 |
| 2009/0117423 A1 * | 5/2009 | Eickhoff | H01M 4/8605 |
| | | | 429/515 |
| 2014/0157565 A1 | 6/2014 | Eickhoff | |
| 2014/0342261 A1 | 11/2014 | Eickhoff | |
| 2015/0132676 A1 | 5/2015 | Eickhoff | |

FOREIGN PATENT DOCUMENTS

| | | | | |
|---|---|---|---|---|
| CN | 101536235 A | 9/2009 | | |
| CN | 104638285 A | 5/2015 | | |
| CN | 106549175 A | 3/2017 | | |
| EP | 2874221 A1 | 5/2015 | | |
| EP | 3145015 A1 | 3/2017 | | |
| GB | 2538991 A | 12/2016 | | |
| GB | 2540397 A | 1/2017 | | |
| JP | H01-162791 | * | 6/1989 | ............. C23C 18/16 |
| JP | 2007-323939 | * | 12/2007 | ............ Y02E 60/521 |

OTHER PUBLICATIONS

Ask Tom Why, Chicago Tribune, Weather section published Dec. 2011, online {https://web.archive.org/web/20110801000000*/http://articles.chicagotribune.com/2011-12-16/news/ct-wea-1216-asktom-20111216_1_relative-humidity-zero-dew-point.*
JP 2007323939 A Dec. 13, 2007 DERWENTprinted May 11, 2019.*
JP 2007323939 A Dec. 13, 2007 Espacenet English Machine Translation—printed May 11, 2019.*
USGS The Water Cycle_ Summary, from USGS Water Science School : {https://water.usgs.gov/edu/watercycletouzbek.html} with Wayback web posting evidence Feb. 19, 2015.*
"European Application Serial No. 16179362.5, Extended European Search Report dated Jan. 30, 2017", 11 pgs.
"European Application Serial No. 16179362.5, Communication Pursuant to Article 94(3) EPC dated Feb. 5, 2018", 6 pgs.
"Chinese Application Serial No. 201610819846.7, Office Action dated Aug. 4, 2020" (w/ English Translation), 18 pgs.
"Chinese Application Serial No. 201610819846.7, Response filed Feb. 18, 2021 to Office Action dated Aug. 4, 2020", (w/ English Translation of Claims), 11 pgs.
"European Application Serial No. 16179362.5, Response filed Sep. 20, 2017 to Extended European Search Report dated Jan. 30, 2017", 19 pgs.
"Chinese Application Serial No. 201610819846.7, Office Action dated Apr. 6, 2021", (w/ English Translation), 13 pgs.

* cited by examiner

OXYGEN REGULATED FUEL CELL

GOVERNMENT FUNDING

This invention was made with Government support under contract: \*\*\*-\*\*\*\*229G001. The Government has certain rights in the invention.

BACKGROUND

Current batteries for portable electronic equipment, such as a hand held mobile devices need to be recharged fairly often. With increasing functionality of such equipment, come increasing power demands. The desired portability of the electronic equipment leads to space constraints, further increasing the demands on battery performance. The energy density of existing batteries is proving insufficient to keep pace with the power requirements of portable electronic equipment.

Micro fuel cells may utilize water vapor recovered from hydrogen/air proton electron membrane fuel cells to generate hydrogen via a hydrolysis reaction with a water reactive fuel such as a chemical hydride. A mechanism may be used to regulate the hydrogen generation rate by regulating water vapor provided to the fuel. A membrane type valve has typically been used to regulate water permeation through a membrane based on the pressure difference across the membrane. While such a membrane based water regulation approach works well for relatively low power density fuel cell based power generators, such approaches tend to use a tortuous diffusion path for the water vapor, resulting in a significant increase in thickness or operating temperature to scale to higher power, negatively affecting power generator energy density.

SUMMARY

A device includes a container having a top plate containing an array of oxygen limiting pinholes and a chamber to hold a chemical hydride fuel, a fuel cell proton exchange membrane electrode assembly supported within the container between the top plate and the chamber, a first gas diffusion layer supported between the fuel cell proton exchange membrane electrode assembly and the top plate, and a second gas diffusion layer supported between the fuel cell proton exchange membrane electrode assembly and the chamber.

An alternative device includes a container having a top plate containing an array of oxygen limiting pinholes and a chamber to hold a chemical hydride fuel, and a fuel cell membrane electrode assembly supported within the container between the top plate and the chamber positioned to receive oxygen from the pinholes and hydrogen from the chamber.

A method includes exposing a cathode of a fuel cell membrane electrode assembly to a limited supply of oxygen via one or more pinholes in a power generator container, providing hydrogen to an anode of the fuel cell membrane electrode assembly from a chamber containing a chemical hydride, reacting the oxygen and hydrogen to produce electricity and water vapor, and providing the generated water vapor to the chemical hydride to cause the chemical hydride to generate more hydrogen.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
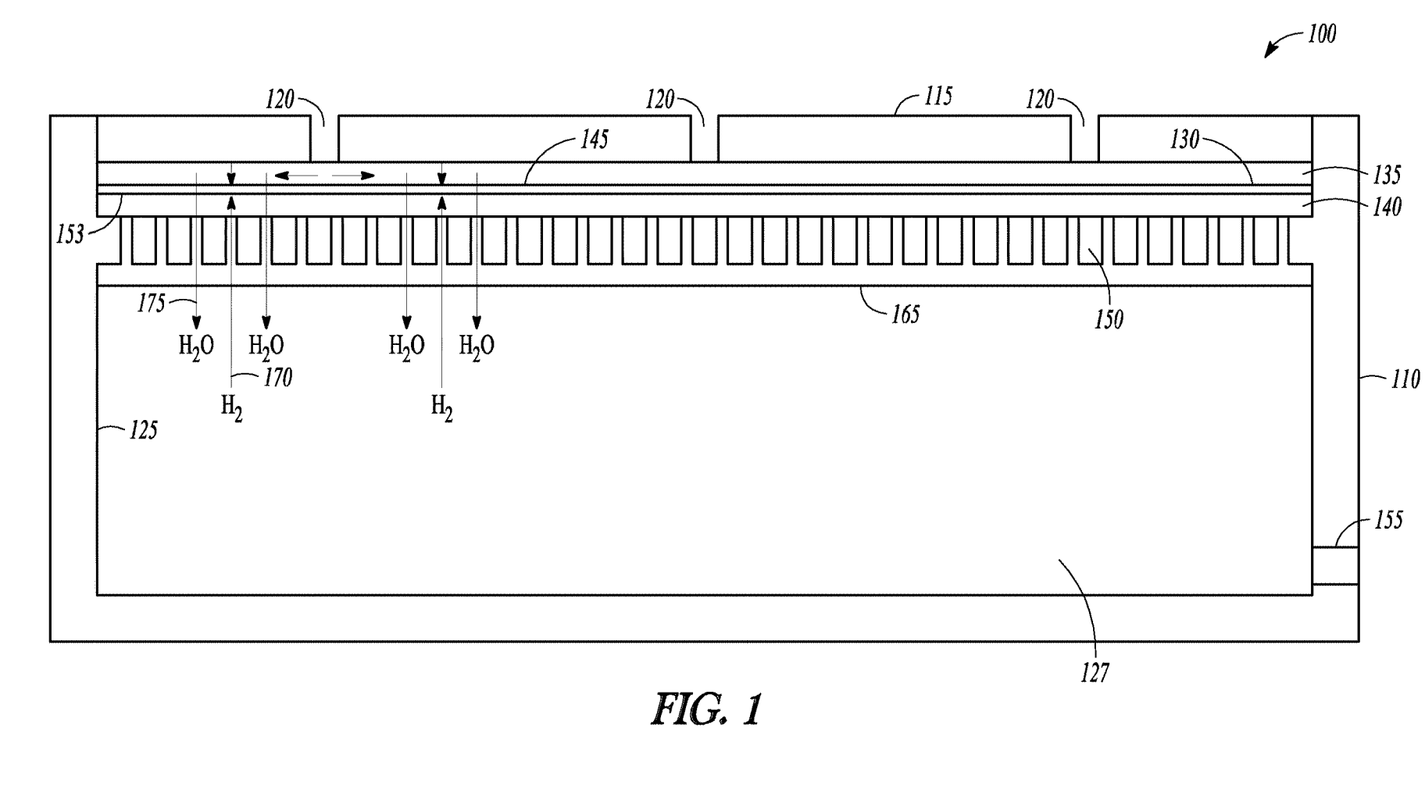
FIG. 1 is a block diagram side cross section of a power generator having pinhole openings to regulate oxygen flow according to an example embodiment.

FIG. 1 is a block diagram cross section view of a power generator 100. Power generator 100 may include a container 110 having a top plate 115 containing an array of oxygen limiting pinholes 120. The container forms a chamber 125 to hold a chemical hydride fuel 127.

A fuel cell membrane electrode assembly 130 is supported within the container between the top plate 115 and the chamber 125. The membrane electrode assembly 130 comprises a proton exchange membrane coated on both sides with catalyst electrode, the catalyst electrode may be patterned in various embodiments.

A first, gas diffusion layer 135 is supported between the fuel cell proton exchange membrane electrode assembly 130 and the top plate 115. A second gas diffusion layer 140 is supported between the membrane electrode assembly 130 and the chamber 125. The gas diffusion layers may comprise porous carbon fiber or carbon paper, and may include a micro porous layer on the side facing the membrane electrode assembly.

Figure 2:
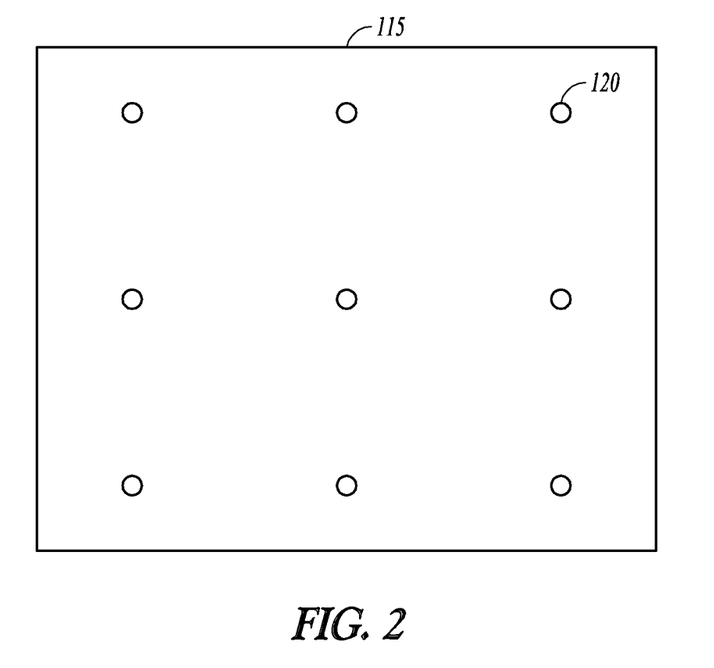
FIG. 2 is a top view of a top plate of the power generator of FIG. 2 illustrating an array of pinholes according to an example embodiment.

The array of oxygen limiting pinholes 120, shown in a top view of top plate 115 in FIG. 2, may be sized to limit oxygen supplied to a cathode side 145 of the fuel cell proton exchange membrane electrode assembly 130. In one embodiment, the oxygen limiting pinholes have a size corresponding to a design point to provide an average power of a selected load, such as for example 500 mW. The pinholes may also limit the amount of water vapor provided to the power generator from ambient atmosphere, which may have an added benefit of reducing the power generator operating pressure under hot and humid conditions, as less water reaches the fuel, limiting over production of hydrogen from the fuel. Water vapor produced by the chemical reaction of the hydrogen and oxygen at the fuel cell proton exchange membrane electrode assembly 130 is provided back to the fuel and is sufficient to keep the power generator generating the design point average power.

Some loads may include energy storage devices, such as a super capacitor or a rechargeable battery, which may be charged utilizing the average power provided by the power generator. The load may use the stored energy for providing pulses of higher power, such as when transmitting sensed values in the case of the load being a wireless sensor.

In some embodiments, the fuel cell reaction utilizes 0.5 moles of hydrogen per mole of water produced. The O2 concentration in air (ambient) is approximately 20%, and the water concentration typically ranges from 1-2% resulting in an oxygen to water ratio of 10 to 20X. Given these parameters, the size and density of the pinholes in the top plate 115 that provide oxygen to the cathode may be easily designed for a known average power level. The pinholes may have a round cross section in one embodiment, or may be any shape desired and may be formed by laser cutting, punching, molding, or other means. Example hole numbers for various temperatures and power levels are shown in the following TABLE 1:

TABLE 1

Number of 3 mil diameter holes in a 6 mil thick top plate, for various temperatures and power levels.

| Temperature ° C. | Number of 3 mil holes for 0.5 W | Number of 3 mil holes for 1 W | Number of 3 mil holes for 1.5 W |
|---|---|---|---|
| 0 | 1124 | 2248 | 3372 |
| 10 | 1094 | 2188 | 3282 |
| 20 | 1066 | 2132 | 3198 |
| 30 | 1040 | 2080 | 3120 |
| 40 | 1015 | 2030 | 3045 |

The oxygen limiting pinholes are coupled to ambient atmosphere to obtain exposure to oxygen and water vapor and wherein the oxygen limiting pinholes restrict water vapor recovered from ambient atmosphere such that oxygen is the primary regulator of electricity generated by the fuel cell proton exchange membrane. The oxygen limiting pinholes are configured in one embodiment to regulate oxygen provided to the cathode of the fuel cell proton exchange membrane electrode assembly to control electricity generated without regulation of water vapor. By placing the pinholes in the top plate, adjacent the first gas diffusion layer and the cathode side of the fuel cell proton exchange membrane electrode assembly, a very short diffusion path for oxygen is provided. This may also allow the fuel cell portion of the power generator to be made fairly thin, since additional paths for flow of oxygen, water vapor, or hydrogen may be reduced or eliminated.

In one embodiment, the cathode layer is continuous across the power generator with the pinholes positioned uniformly to distribute oxygen to the cathode layer. In the case of a patterned cathode layer, the pin holes may be aligned or centered over each cathode pattern to facilitate oxygen distribution. In some embodiments, the top plate may contain channels adjacent the first diffusion layer extending from the pin holes to assist in distributing oxygen from the pin holes to the cathode layer. In other embodiments, the first diffusion layer provide sufficient oxygen distribution.

In one embodiment, a perforated support plate 150 is supported by the container 110 between the second diffusion layer 140 and the bottom chamber 125. The perforated support plate 150 contains perforation to allow unrestricted flow of hydrogen and water vapor between the fuel in the chamber 125 and the second diffusion layer 140 which is adjacent an anode 153 side of the proton exchange membrane. Suitable adhesives may be used to adhere the various fuel cell layers together in some embodiments, or the layers may simply be supported between the top plate 115 and support plate 150. In various embodiments, the container and plates may be formed of metal, polymer, or other materials that are compatible with the fuel cell, chemical fuel, and membrane materials.

In a further embodiment, a hydrogen pressure relief valve 155 is supported by the container and is located in the chamber to provide a pressure relief path to ambient to vent hydrogen when the pressure within the chamber exceeds a selected threshold. Valve 155 may open to vent the hydrogen if more hydrogen is produced than can be consumed by the fuel cell. Ambient conditions or lower energy demand by a load may contribute to excess hydrogen being produced resulting in a pressure that exceeds the pressure threshold of the valve 155.

In one embodiment, the chamber 125 may be filled with the chemical hydride fuel 127 separated from the fuel cell proton exchange membrane electrode assembly by a particulate filter 165. Many different chemical hydrides may be used for the hydrogen producing fuel, such as for example AlH3, LiAlH4, LiH, NaAlH4, CaH2, and NaH as well as others in various embodiments. Fuel including Li may provide for desirable recycling of spent fuel blocks, which in some embodiments are replaceable in the power generator. The fuel may be formed with an engineered particle size, distribution, and controlled density. For example, the fuel may be formed in a hydraulic press with a die, and contain particle sizes in the range of 1 to 100 µm. In one embodiment, the size of the particles may be between 5 to 10 µm. The particles may all be the same size, or may have different ranges of particle sizes within one or more of the above ranges. In one embodiment, particle sizes outside of the above ranges are limited so as to not adversely affect performance of hydrogen generation and utilization of the fuel.

Hydrogen generated in the fuel cartridge is transported to as indicated by arrows 170 and consumed at the anode side 153 of the fuel cell, while oxygen in the ambient airflow through the pin holes is consumed at cathode side 145 of the fuel cell proton exchange membrane electrode assembly 130. The fuel cell produces water vapor and heat when reacting the hydrogen and oxygen, as well as electricity. Some of the water vapor may proceed back to the fuel cartridge as indicated by arrows 175 for use in generating more hydrogen.

Figure 3:
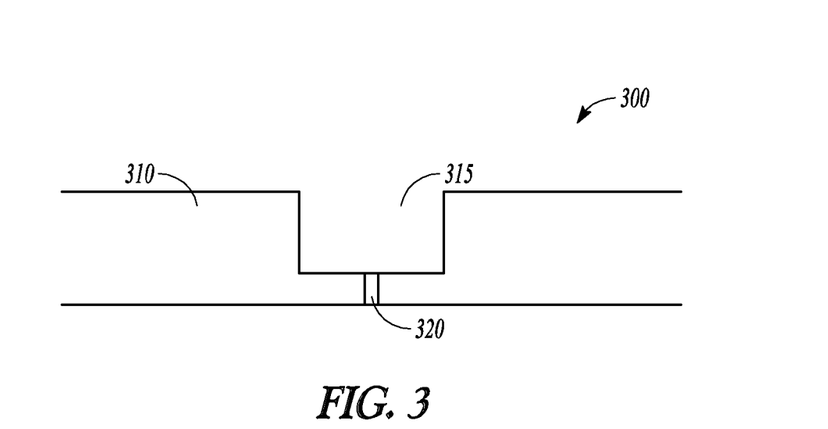
FIG. 3 is a block diagram cross section of a top plate opening with a pinhole according to an example embodiment.

FIG. 3 is a cross section illustrating an alternative pinhole arrangement at 300 in a top plate 310. Top plate 310 may contain an array of openings exposed to ambient, one of which is indicated at 315. The openings 315 extend partially through the top plate. A pinhole 320 may be formed in a bottom of one or more of the openings 315. The openings 315 have a larger cross section than the pinholes 320. The larger cross section may be useful in preventing fouling of the oxygen path, which might be problematic in some operating environments for pinholes extending all the way through the top plate 310. Fouled pinholes would result in reduce power generation as oxygen flow would be further constrained. By reducing the length of the pinhole to a shorter distance, fouling is less likely.

In further embodiments many more rows and columns of pinholes may be provided and may be distributed in different patterns than that shown. While the pinholes in one embodiment are centered on repeating patterns of membrane electrode assemblies, they may be dispersed in different patterns themselves. In some embodiments, multiple pinholes may be distributed about each repeating pattern of membrane electrode assemblies. The membrane electrode assemblies may also be formed of different patterns, which need not be uniform. In one embodiment, the total cross sectional area of all the pinholes is selected to meet the average power requirements of an expected load.

Figure 4:
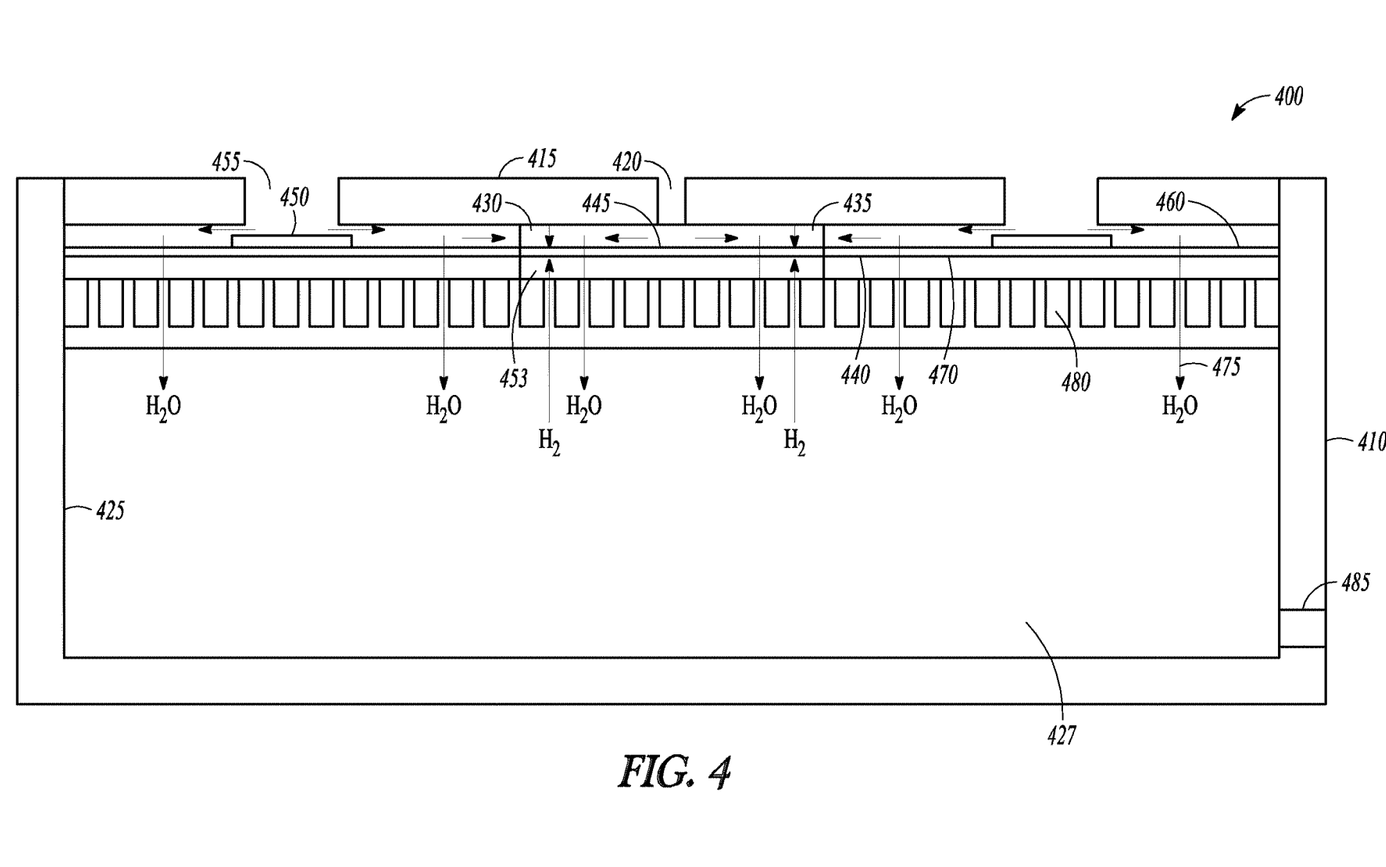
FIG. 4 is a block diagram side cross section of a power generator having pinhole openings and pressure responsive valve assemblies illustrated in an open position to regulate oxygen flow according to an example embodiment.

FIG. 4 is a block diagram cross section view of a power generator 400. Power generator 400 may include a container 410 having a top plate 415 containing an array of oxygen limiting pinholes 420. The container forms a chamber 425 to hold a chemical hydride fuel 427.

A fuel cell proton exchange membrane electrode assembly 430 is supported within the container between the top plate 415 and the chamber 425. A first gas diffusion layer 435 is supported between the fuel cell proton exchange membrane electrode assembly 430 and the top plate 415. A second gas diffusion layer 440 is supported between the fuel cell proton exchange membrane electrode assembly 430 and the chamber 425. The gas diffusion layers may comprise porous carbon fiber or carbon paper, and may include a micro porous layer on the side facing the membrane electrode assembly.

In one embodiment, the membrane electrode layer 430 maybe fully catalyzed or selectively patterned. The membrane electrode layer 430 in one embodiment is patterned and positioned under each pinhole 420 to receive oxygen sufficient to generate an average energy requirement of an attached load. Additional oxygen to facilitate generation of additional energy for the load during increased needs of the load may be provided via a combination of valve plates 450 and valve openings 455 in the top plate 415. The valve plates 450 may be supported between the membrane electrode assemblies by selectively permeable valve membranes 460 that are permeable to water vapor, but impermeable to hydrogen and oxygen. The valve membranes hold the valve plates 450 in alignment with the valve openings 455 to selectively cover and uncover the openings. The valve membranes 460 flex in response to differences in pressure across the valve membranes 460 to move the valve plates 450 to cover or uncover the openings 455. In one embodiment, the valve membrane 460 may be coupled to various sides of the pattered membrane electrode assembly 430 and optionally to sides of the container 410.

When the pressure in the chamber 425 drops due to increased energy use by the load causing consumption of hydrogen from the chamber 425, the valve membranes 460 flex away from the valve openings 455, as shown in FIG. 4, allowing flow of oxygen and water vapor from ambient through the valve openings 455 to increase. The oxygen flows through an open path between the top plate 415 and valve membrane 460 to the membrane electrode assembly 430 as indicated by arrows 470. The open path extends around each valve plate 450, providing for free flow of oxygen to the patterned membrane electrode assembly 430. The water vapor flows through the valve membrane to the chamber as indicated by arrows 475. The water vapor passes through the valve membrane 460 into the chamber 425 resulting in more hydrogen being produced. The additional oxygen allows the membrane electrode assembly 430 to produce more energy, satisfying the increased demand of the load.

Figure 5:
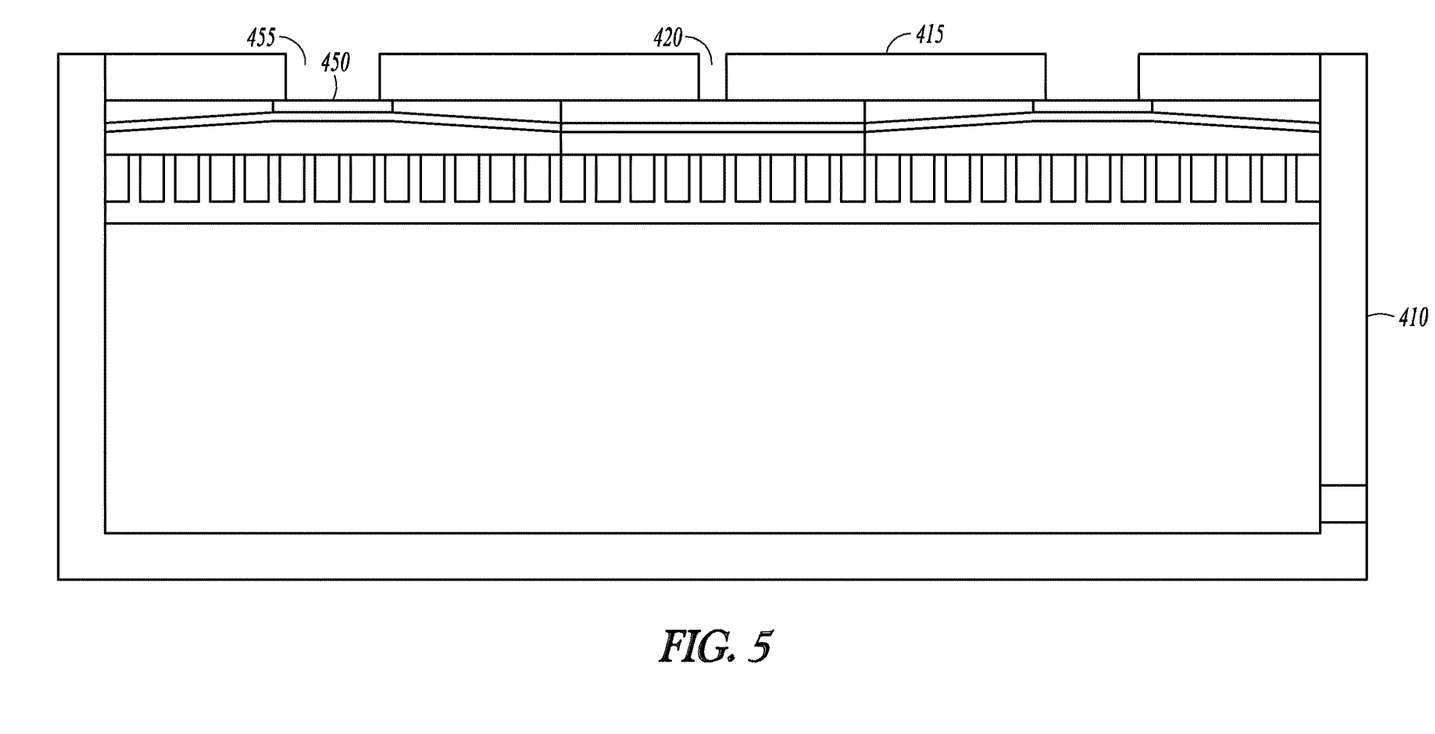
FIG. 5 is a block diagram side cross section of a power generator having pinhole openings and pressure responsive valve assemblies illustrated in a closed position to regulate oxygen flow according to an example embodiment.

When the load returns to its average consumption level, the pressure in the chamber 425 increases, causing the valve membrane 460 to flex in the direction of the valve openings 455, covering the valve openings 455 with the valve plates 450, which returns the oxygen flow rate to that provided by the pinholes 420. The closed position of the valve plates 450 and valve openings 455 is illustrated in FIG. 5, wherein the numbering is consistent with FIG. 4.

Figure 6:
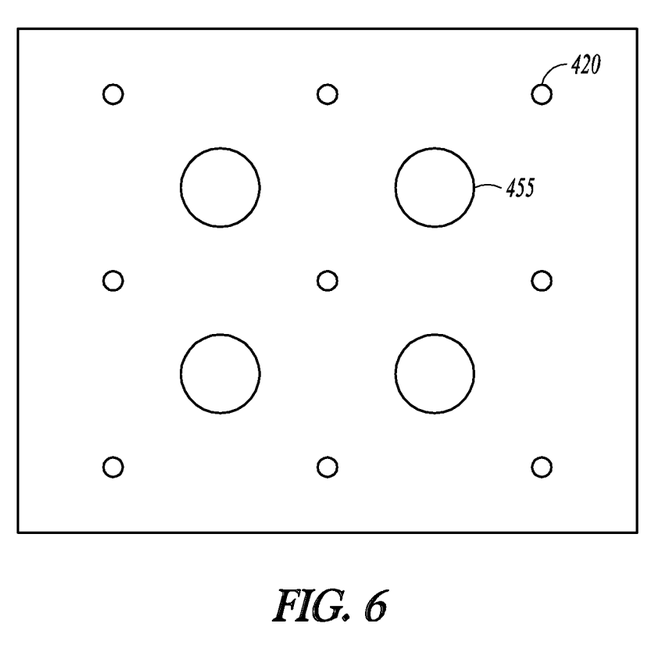
FIG. 6 is a top view of a top plate of the power generator of FIG. 4 illustrating an array of pinholes and valve openings according to an example embodiment.

The array of oxygen limiting pinholes 420, shown in a top view of top plate 415 in FIG. 6, may be sized to limit oxygen supplied to a cathode side 445 of the fuel cell proton exchange membrane electrode assembly 430. In one embodiment, the oxygen limiting pinholes have a size corresponding to a design point to provide an average power of a selected load, such as for example 500 mW. The pinholes may also limit the amount of water vapor provided to the power generator from ambient atmosphere, which may have an added benefit of reducing the power generator operating pressure under hot and humid conditions, as less water reaches the fuel, limiting over production of hydrogen from the fuel. Water vapor produced by the chemical reaction of the hydrogen and oxygen at the fuel cell proton exchange membrane electrode assembly 430 is provided back to the fuel and is sufficient to keep the power generator generating the design point average power.

FIG. 6 also illustrates the valve openings 455 as an array of openings 455 interspersed between the pinholes 420. The example shown in FIG. 6 may be a simplified example embodiment. In further embodiments many more rows and columns of pinholes and valve openings may be provided and may be distributed in different patterns than that shown. While the pinholes in one embodiment are centered on repeating patterns of membrane electrode assemblies, they may be dispersed in different patterns themselves. In some embodiments, multiple pinholes may be distributed about each repeating pattern of membrane electrode assemblies. The membrane electrode assemblies may also be formed of different patterns, which need not be uniform. In one embodiment, the total cross sectional area of all the pinholes is selected to meet the average power requirements, such as 500 mW, of an expected load, while the total maximum oxygen flow rate provided by the valve plate and valve plate openings when open is selected to meet peak energy requirements of the expected load, such as 1.5 W.

In one embodiment, a perforated support plate 480 is supported by the container 410 between the second diffusion layer 453 and the bottom chamber 425. The perforated support plate 480 contains perforation to allow unrestricted flow of hydrogen and water vapor between the fuel in the chamber 425 and the second diffusion layer 453 which is adjacent an anode 440 side of the proton exchange membrane. Suitable adhesives may be used to adhere the various fuel cell layers together in some embodiments, or the layers may simply be supported between the top plate 415 and support plate 480.

In a further embodiment, a hydrogen pressure relief valve 485 is supported by the container 410 and is located in the chamber 425 to provide a pressure relief path to ambient to vent hydrogen when the pressure within the chamber 425 exceeds a selected threshold. Valve 485 may open to vent the hydrogen if more hydrogen is produced than can be consumed by the fuel cell. Ambient conditions or lower energy demand by a load may contribute to excess hydrogen being produced resulting in a pressure that exceeds the pressure threshold of the valve 485.

EXAMPLES

1. A device comprising:
a container having a top plate containing an array of oxygen limiting pinholes and a chamber to hold a chemical hydride fuel;
a fuel cell proton exchange membrane electrode assembly supported within the container between the top plate and the chamber;
a first gas diffusion layer supported between the fuel cell proton exchange membrane electrode assembly and the top plate; and
a second gas diffusion layer supported between the fuel cell proton exchange membrane electrode assembly and the chamber.

2. The device of example 1 wherein the array of oxygen limiting pinholes are sized to limit oxygen supplied to a cathode of the fuel cell proton exchange membrane electrode assembly.

3. The device of example 2 wherein the oxygen limiting pinholes have a size corresponding to an average power of a selected load.

4. The device of example 3 wherein the oxygen limiting pinholes are coupled to ambient atmosphere to obtain exposure to oxygen and water vapor and wherein the oxygen limiting pinholes restrict water vapor recovered from ambient atmosphere such that oxygen is the primary regulator of electricity generated by the fuel cell proton exchange membrane.

5. The device of any of examples 1-4 wherein the oxygen limiting pinholes are configured to regulate oxygen provided to a cathode of the fuel cell proton exchange membrane electrode assembly to control electricity generated without regulation of water vapor.

6. The device of any of examples 1-5 and further comprising a perforated support plate supported by the container between the second diffusion layer and the bottom chamber.

7. The device of any of examples 1-6 and further comprising a hydrogen pressure relief valve supported by the container in the chamber.

8. The device of any of examples 1-7 wherein the chamber comprises a chemical hydride fuel separated from the fuel cell proton exchange membrane electrode assembly by a particulate filter.

9. The device of any of examples 1-8 wherein the fuel cell proton exchange membrane electrode assembly comprises an anode layer adjacent the second gas diffusion layer and a cathode layer adjacent the first gas diffusion layer.

10. The device of any of examples 1-9 wherein the fuel cell proton exchange membrane electrode assembly comprises a cathode layer adjacent the first gas diffusion layer such that the pin holes provide a limited supply of oxygen to the cathode layer through the first gas diffusion layer.

11. A device comprising:
a container having a top plate containing an array of oxygen limiting pinholes and a chamber to hold a chemical hydride fuel; and
a fuel cell membrane electrode assembly supported within the container between the top plate and the chamber positioned to receive oxygen from the pinholes and hydrogen from the chamber.

12. The device of example 11 wherein the array of oxygen limiting pinholes are sized to limit oxygen supplied to a cathode of the fuel cell membrane electrode assembly.

13. The device of example 12 wherein the oxygen limiting pinholes have a size corresponding to an average power of a selected load.

14. The device of example 13 wherein the oxygen limiting pinholes are coupled to ambient atmosphere to obtain exposure to oxygen and water vapor and wherein the oxygen limiting pinholes restrict water vapor recovered from ambient atmosphere such that oxygen is the primary regulator of electricity generated by the fuel cell membrane electrode assembly.

15. The device of any of examples 11-14 wherein the oxygen limiting pinholes are configured to regulate oxygen provided to a cathode of the membrane electrode assembly to control electricity generated without regulation of water vapor.

16. The device of any of examples 11-15 wherein the chamber comprises a chemical hydride fuel separated from the membrane electrode assembly by a particulate filter.

17. The device of any of examples 11-16 wherein the membrane electrode assembly comprises a cathode layer adjacent the pin holes that provide a limited supply of oxygen to the cathode layer through the first gas diffusion layer.

18. A method comprising:
exposing a cathode of a fuel cell membrane electrode assembly to a limited supply of oxygen via one or more pinholes in a power generator container;
providing hydrogen to an anode of the fuel cell membrane electrode assembly from a chamber containing a chemical hydride;
reacting the oxygen and hydrogen to produce electricity and water vapor; and
providing the generated water vapor to the chemical hydride to cause the chemical hydride to generate more hydrogen.

19. The method of example 18 wherein the one or more pinholes are dimensioned to provide an amount of oxygen to cause the fuel cell membrane electrode assembly to provide a selected average energy for consumption by a load.

20. The method of any of examples 18-19 and further comprising relieving excess hydrogen pressure in the chamber via a relief valve.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A device restricting oxygen and water vapor comprising:
a container having a top plate containing an array of pinholes and a chamber to hold a chemical hydride fuel, each of the pinholes providing a direct oxygen diffusion path between ambient atmosphere and the container; and
a fuel cell membrane electrode assembly supported within the container between the top plate and the chamber, wherein:
a number of pinholes and a diameter of pinholes provide a total cross-sectional area, and the total cross-sectional area and a thickness of pinholes are selected to limit oxygen supplied from the ambient atmosphere to a cathode of the fuel cell membrane electrode assembly to limit an average power generated by the fuel cell membrane electrode assembly;

the number of pinholes, the diameter of pinholes, and the thickness of pinholes restrict water vapor recovered from ambient atmosphere such that oxygen is the primary regulator of electricity generated by the fuel cell membrane electrode assembly;

a first, gas diffusion layer supported between the fuel cell membrane electrode assembly and the top plate, the first gas diffusion layer abutting the top plate to minimize the direct oxygen diffusion path between the first gas diffusion layer and ambient atmosphere; and a second gas diffusion layer supported between the fuel cell membrane electrode assembly and the chamber.

2. The device of claim 1 wherein each pinhole within the array of pinholes includes a pinhole diameter of 3 mils to limit oxygen supplied to the cathode of the fuel cell membrane electrode assembly.

3. The device of claim 1 wherein a number of the pinholes is selected to provide a total pinhole cross-sectional area corresponding to an average power of a selected load.

4. The device of claim 1 wherein:
each of the pinholes is connected through a corresponding ambient opening of larger diameter to provide the direct oxygen diffusion path between ambient atmosphere and the first gas diffusion layer to obtain exposure to oxygen and water vapor; and
each opening within the array of ambient openings includes an outer hole diameter that is larger than each pinhole diameter within the array of pinholes that prevents fouling of an oxygen path through each opening and each pinhole.

5. The device of claim 1 wherein the pinholes are configured to regulate oxygen provided to the cathode of the fuel cell membrane electrode assembly to control electricity generated without regulation of water vapor.

6. The device of claim 1 and further comprising a perforated support plate supported by the container between the second gas diffusion layer and the chamber.

7. The device of claim 1 and further comprising a hydrogen pressure relief valve supported by the container in the chamber.

8. The device of claim 1 wherein the chamber comprises a chemical hydride fuel separated from the fuel cell membrane electrode assembly by a particulate filter.

9. The device of claim 1 wherein the fuel cell membrane electrode assembly comprises an anode layer adjacent the second gas diffusion layer and a cathode layer adjacent the first gas diffusion layer.

10. The device of claim 1 wherein the fuel cell membrane electrode assembly comprises the cathode layer adjacent the first gas diffusion layer such that the pinholes provide a limited supply of oxygen to the cathode layer through the first gas diffusion layer.

11. A device comprising:
a container having a top plate containing an array of pinholes and a chamber to hold a chemical hydride fuel, each of the pinholes providing a direct oxygen diffusion path between ambient atmosphere and the container; and
a fuel cell membrane electrode assembly supported within the container between the top plate and the chamber positioned to receive oxygen from the pinholes and hydrogen from the chamber, wherein:
a number of pinholes and a diameter of pinholes provide a total cross-sectional area, and the total cross-sectional area and a thickness of pinholes are selected to oxygen supplied from the ambient atmosphere to the fuel cell membrane electrode assembly to limit an average power generated by the fuel cell membrane electrode assembly;
the number of pinholes, the diameter of pinholes, and the thickness of pinholes restrict water vapor recovered from ambient atmosphere such that oxygen is the primary regulator of electricity generated by the fuel cell membrane electrode assembly; and
a first gas diffusion layer supported between the fuel cell membrane electrode assembly and the top plate, the first gas diffusion layer abutting the top plate to minimize the direct oxygen diffusion path between the first gas diffusion layer and ambient atmosphere.

12. The device of claim 11 wherein each pinhole within the array of pinholes includes a pinhole diameter of 3 mils to limit oxygen supplied to a cathode of the fuel cell membrane electrode assembly.

13. The device of claim 11 wherein a number of the pinholes is selected to provide a total pinhole cross-sectional area corresponding to an average power of a selected load.

14. The device of claim 13 wherein:
each of the pinholes is connected through a corresponding ambient opening of larger diameter to provide the direct oxygen diffusion path between ambient atmosphere and the first gas diffusion layer to obtain exposure to oxygen and water vapor; and
each opening within the array of ambient openings includes an outer hole diameter that is larger than each pinhole diameter within the array of pinholes that prevents fouling of the direct oxygen diffusion path through each opening and each pinhole.

15. The device of claim 11 wherein the pinholes are configured to regulate oxygen provided to a cathode of the fuel cell membrane electrode assembly to control electricity generated without regulation of water vapor.

16. The device of claim 11 wherein the chamber comprises a chemical hydride fuel separated from the membrane electrode assembly by a particulate filter.

17. The device of claim 11 wherein the membrane electrode assembly comprises a cathode layer adjacent the pinholes that provide a limited supply of oxygen to the cathode layer through the first gas diffusion layer.

18. A method comprising:
exposing a cathode of a fuel cell membrane electrode assembly to a limited supply of oxygen via one or more pinholes in a power generator container, wherein:
a number of pinholes and a diameter of pinholes provide a total cross-sectional area, and the total cross-sectional area and a thickness of pinholes are selected to limit oxygen supplied from the ambient atmosphere to the cathode to limit an average power generated by the fuel cell membrane electrode assembly;
the number of pinholes, the diameter of pinholes, and the thickness of pinholes restrict water vapor recovered from ambient atmosphere such that oxygen is the primary regulator of electricity generated by the fuel cell membrane electrode assembly;
providing hydrogen to an anode of the fuel cell membrane electrode assembly from a chamber containing a chemical hydride;
reacting the oxygen and hydrogen to produce electricity and water vapor; and
providing the produced water vapor to the chemical hydride to cause the chemical hydride to generate more hydrogen.

19. The method of claim 18 wherein a number of the one or more pinholes is selected to provide a total pinhole cross-sectional area to provide an amount of oxygen to cause the fuel cell membrane electrode assembly to provide a selected average energy for consumption by a load.

20. The method of claim 18 and further comprising relieving excess hydrogen pressure in the chamber via a relief valve.

* * * * *